US009214711B2

(12) United States Patent
Thomson et al.

(10) Patent No.: US 9,214,711 B2

(45) Date of Patent: Dec. 15, 2015

(54) TWIST SEPTUM POLARIZATION ROTATOR

(71) Applicant: Andrew LLC, Hickory, NC (US)

(72) Inventors: Alexander Peter Thomson, Livingston (GB); Christopher D Hills, Glenrothes (GB); Claudio Biancotto, Edinburgh (GB); Elham Ebrahimi, Edinburgh (GB)

(73) Assignee: CommScope Technologies LLC, Hickory, NC (US)

( * ) Notice: Subject to any disclaimer, the term of this patent is extended or adjusted under 35 U.S.C. 154(b) by 249 days.

(21) Appl. No.: 13/792,324

(22) Filed: Mar. 11, 2013

(65) Prior Publication Data

US 2014/0254976 A1 Sep. 11, 2014

(51) Int. Cl.
*G02B 6/00* (2006.01)
*H01P 1/17* (2006.01)

(52) U.S. Cl.
CPC ...................................... *H01P 1/173* (2013.01)

(58) Field of Classification Search
None
See application file for complete search history.

(56) References Cited

U.S. PATENT DOCUMENTS

| | | | | |
|---|---|---|---|---|
| 2,628,278 | A * | 2/1953 | Zaleski | 333/257 |
| 3,138,769 | A | 6/1964 | De Witt | |
| 3,296,558 | A | 1/1967 | Bleackley | |
| 3,924,205 | A | 12/1975 | Hansen et al. | |
| 4,375,052 | A * | 2/1983 | Anderson | 333/21 A |
| 4,503,379 | A * | 3/1985 | Raiman | 333/21 A |
| 4,755,777 | A * | 7/1988 | Cohen et al. | 333/137 |
| 4,772,893 | A * | 9/1988 | Iwasaki | 343/779 |
| 4,821,046 | A | 4/1989 | Wilkes | |
| 4,829,313 | A | 5/1989 | Taggart | |
| 4,875,027 | A | 10/1989 | Spinner | |
| 4,951,010 | A | 8/1990 | Grim | |
| 6,720,840 | B2 | 4/2004 | Bohnet | |
| 6,853,343 | B2 | 2/2005 | McCandless et al. | |
| 6,970,138 | B2 | 11/2005 | McCandless et al. | |
| 7,053,849 | B1 | 5/2006 | Pike et al. | |
| 7,106,918 | B2 * | 9/2006 | Bita et al. | 385/6 |
| 8,094,978 | B2 * | 1/2012 | Tokushima | 385/14 |
| 2006/0018584 | A1 * | 1/2006 | Watts et al. | 385/11 |
| 2007/0257745 | A1 | 11/2007 | Higgins | |
| 2009/0110344 | A1 | 4/2009 | Little et al. | |
| 2010/0001917 | A1 * | 1/2010 | Manasson et al. | 343/785 |
| 2012/0007792 | A1 | 1/2012 | Brandau et al. | |
| 2014/0153861 | A1 * | 6/2014 | Peng et al. | 385/11 |

FOREIGN PATENT DOCUMENTS

JP 20070281775 10/2007

OTHER PUBLICATIONS

Do Weon Kim, International Search Report for PCT application PCT/US2014/019777, Dec. 16, 2014, Korean Patent Office, Daejeon Metropolitan City, Republic of Korea.

* cited by examiner

*Primary Examiner* — Sung Pak
(74) *Attorney, Agent, or Firm* — Babcock IP, PLLC

(57) ABSTRACT

A waveguide polarization rotator is provided as unitary body with a first bore; a diametral first septum of the unitary body extending between sidewalls of the first bore. The first septum is twisted between a first end of the first septum and a second end of the first septum. The waveguide polarization rotator may be further provided in a matrix configuration with a plurality of second bores each with a diametral second septum of the unitary body extending between sidewalls of the second bores; a longitudinal axis of the first bore and each of the second bores parallel to one another. The waveguide polarization rotator may be manufactured via injection molding, casting or the like.

20 Claims, 9 Drawing Sheets

TWIST SEPTUM POLARIZATION ROTATOR

BACKGROUND

1. Field of the Invention

This invention relates to equipment useful in high frequency radio communications systems. More particularly, the invention is concerned with a polarization rotator for changing the polarization of signals passing through a waveguide.

2. Description of Related Art

Rotator elements placed in-line with a waveguide are useful for changing the polarization of a signal prior to further processing. Waveguides associated with antennas may include polarization rotation functionality, for example, to allow conversion of the antenna between horizontal and vertical polarization, without requiring rotation of the entire antenna assembly.

The geometries of in-line polarization rotation elements are well known in the art. Transition elements inserted into the electrical signal path progressively rotate the signal through a desired angular rotation, such as ninety degrees between "vertical" and "horizontal" polarization or vice versa. The transition elements may be provided as a plurality of plates, layers or the like. However, these additional elements increase the total number of parts, complicating manufacture. Further, the plurality of layers may introduce alignment and/or signal leakage issues between each of the several plates/layers.

Alternatively, the transition elements may be applied as a plurality of pins extending across the waveguide. However, insertion and sealing of each pin end at the waveguide sidewalls may be labor-intensive. U.S. Pat. No. 2,628,278 "Apparatus for Rotating Microwave Energy" issued 20 Sep. 1951 to J. F. Zaleski discloses an adjustable circular waveguide polarization rotator that utilizes a twisted septum element suspended within a waveguide by pins at each end coupled to sidewalls of two rotatable body portions of the waveguide. By twisting the body portions with respect to each other, the septum is twisted to obtain a desired polarization angle transition. Although the required number of sidewall pin interconnections is reduced, the thin septum element suspended between the pins may be susceptible to vibration, sagging and/or other forms of distortion over time.

Depending upon the equipment combination used, a waveguide cross-section transition between, for example, a circular to rectangular waveguide may also be required as a further additional component located, for example, between an antenna and a transmitter or receiver.

Competition within the waveguide and RF equipment industries has focused attention upon improving electrical performance, reduction of the number of overall unique components, as well as reductions of manufacturing, installation and or configuration costs.

Therefore, it is an object of the invention to provide an apparatus that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

The inventors have recognized that, when care is taken to avoid overhanging edges, a polarization rotator with a twist septum may be cost efficiently manufactured with a high level of precision by injection molding, casting or the like, reducing alignment and or sealing issues associated with multiple layer polarization rotation assemblies. Further, in applications in which a high density array of polarization rotators is required, prior issues with access to individual sidewalls, for example for applying through sidewall pin interconnections or the like may be eliminated.

Figure 1:
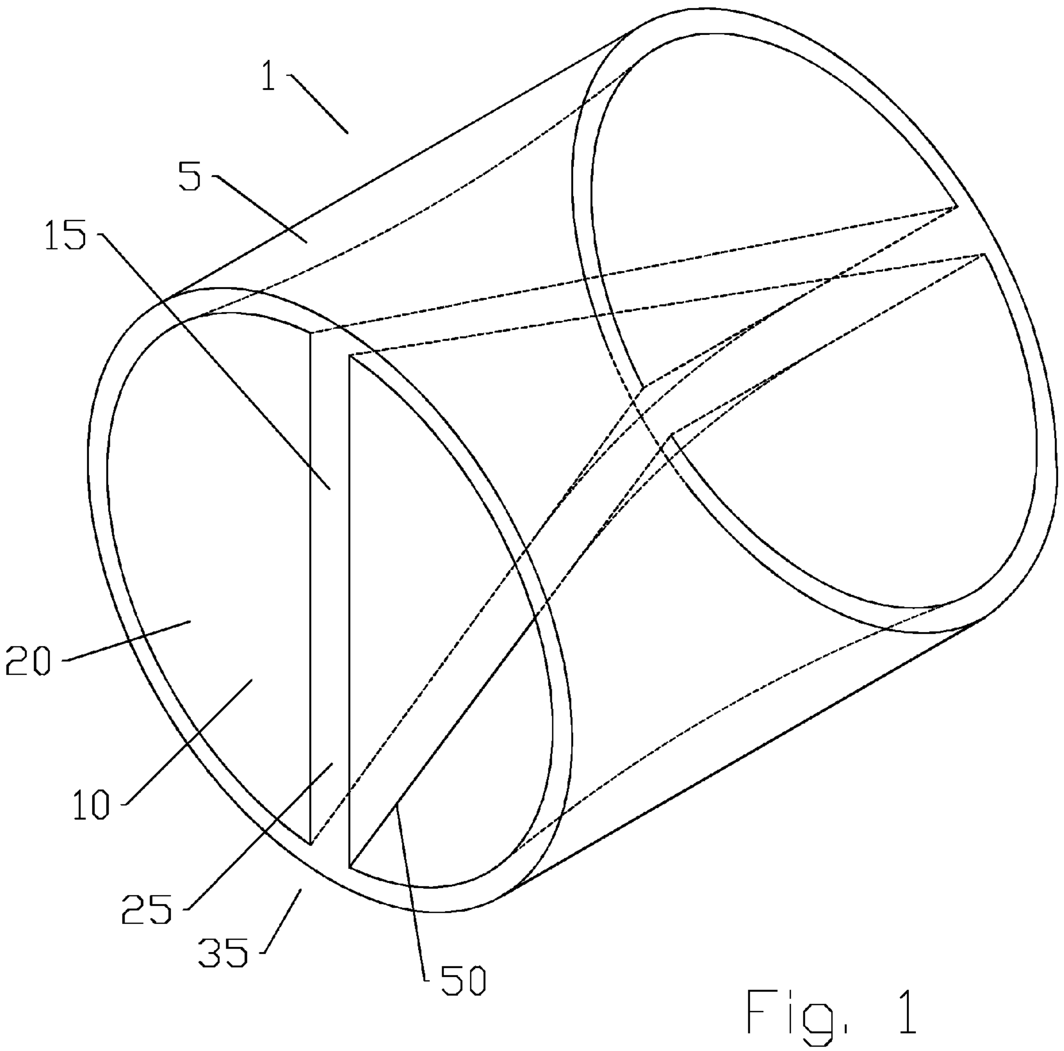
FIG. 1 is a schematic angled isometric view of an exemplary twist septum polarization rotator.
Figure 2:
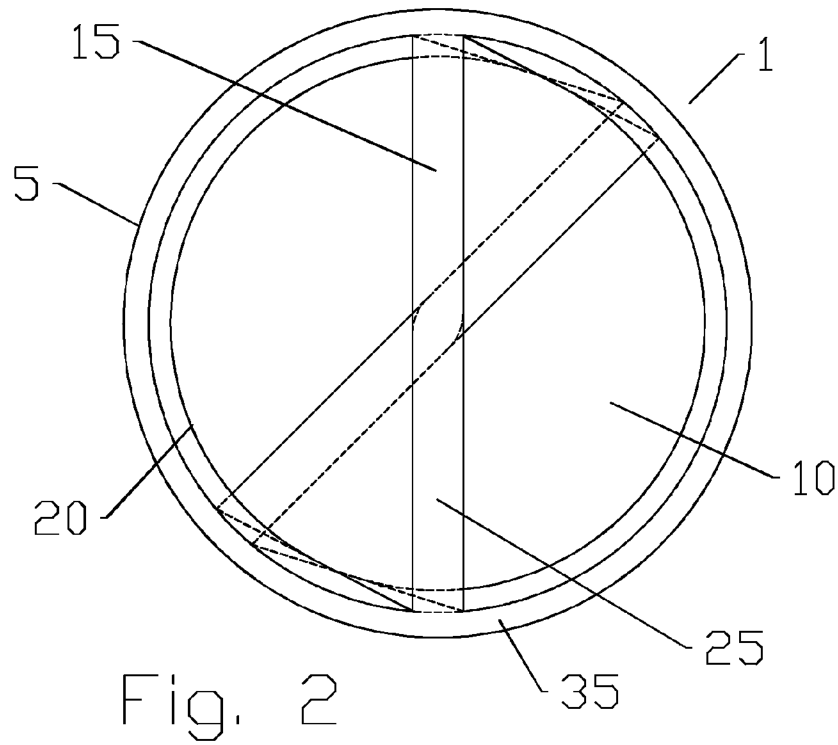
FIG. 2 is a schematic front view of the rotator of FIG. 1.
Figure 3:
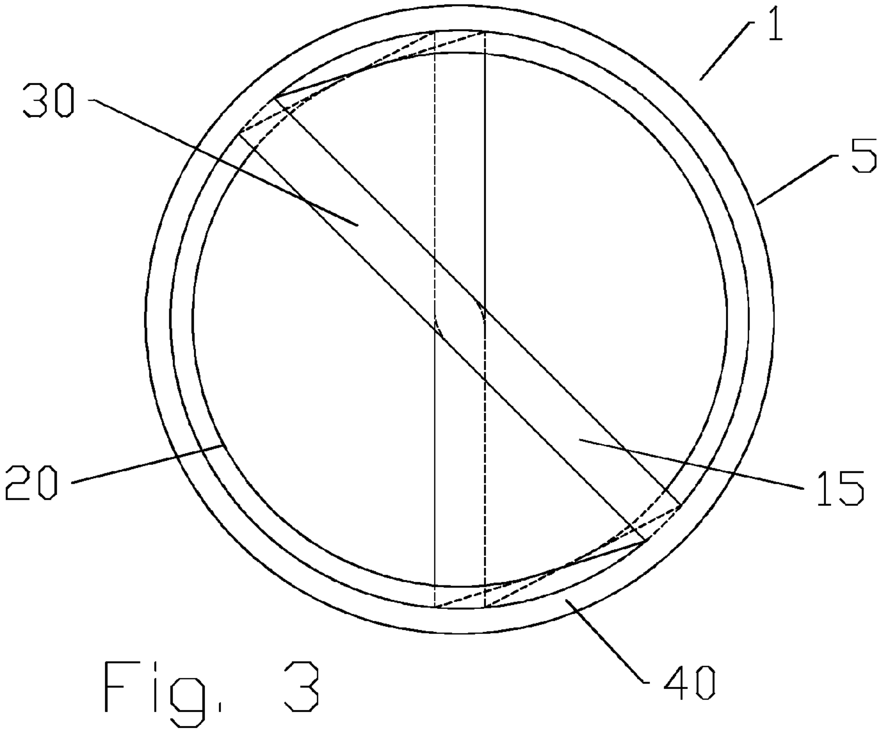
FIG. 3 is a schematic back view of the rotator of FIG. 1.
Figure 4:
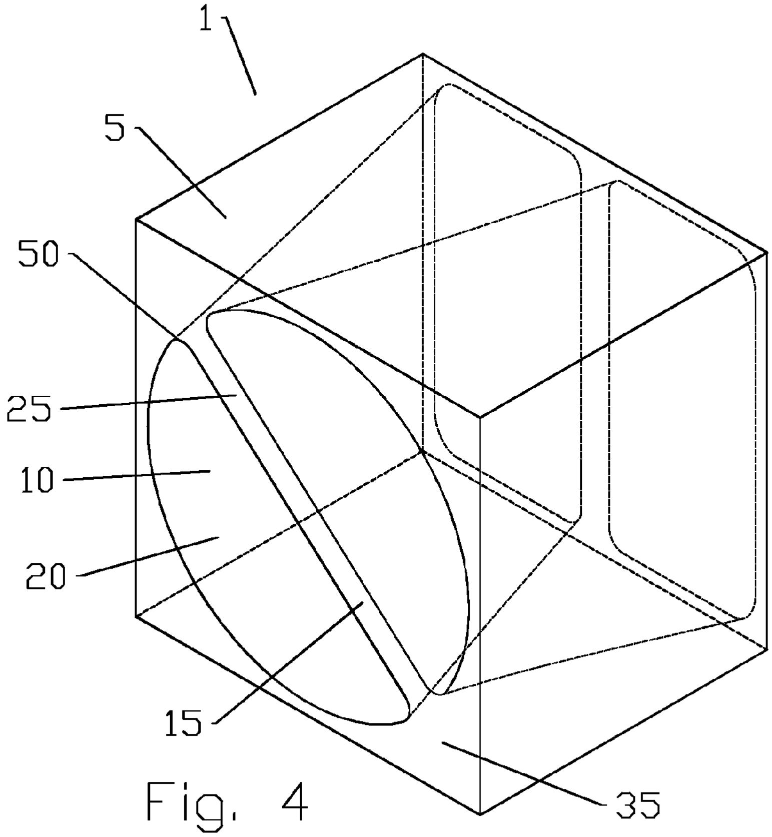
FIG. 4 is a schematic angled front isometric view of an alternative twist septum polarization rotator, demonstrating an integral circular to rectangular cross section transition.
Figure 5:
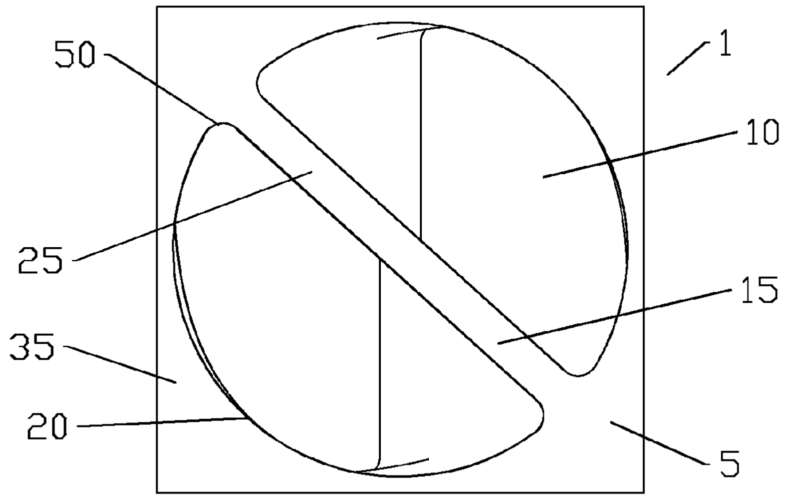
FIG. 5 is a schematic front view of the rotator of FIG. 4.
Figure 6:
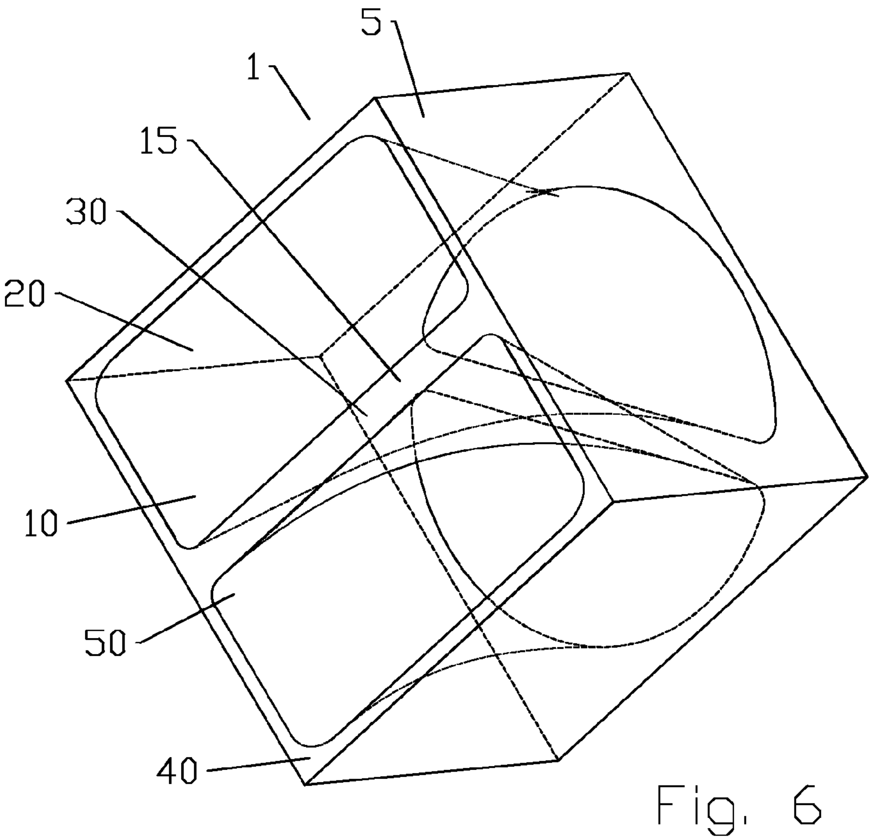
FIG. 6 is a schematic angled back isometric view the rotator of FIG. 4.
Figure 7:
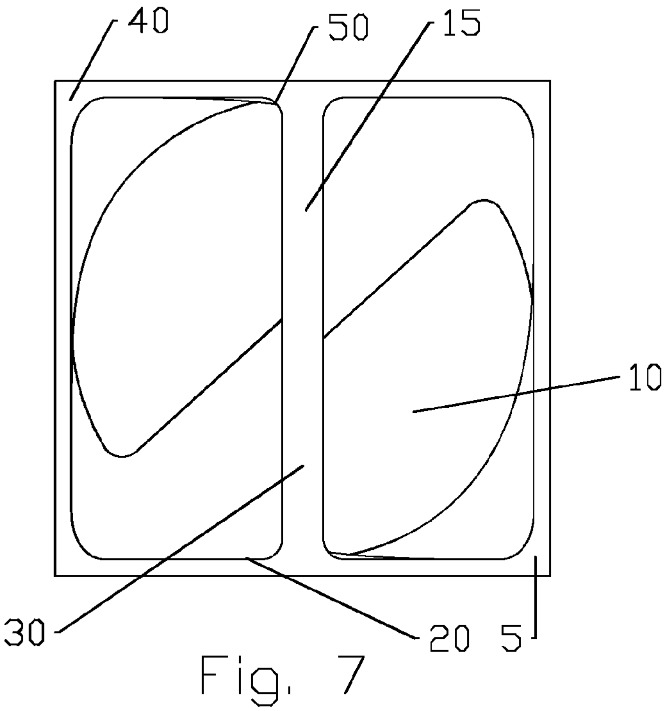
FIG. 7 is a schematic back view of the rotator of FIG. 4.
Figure 8:
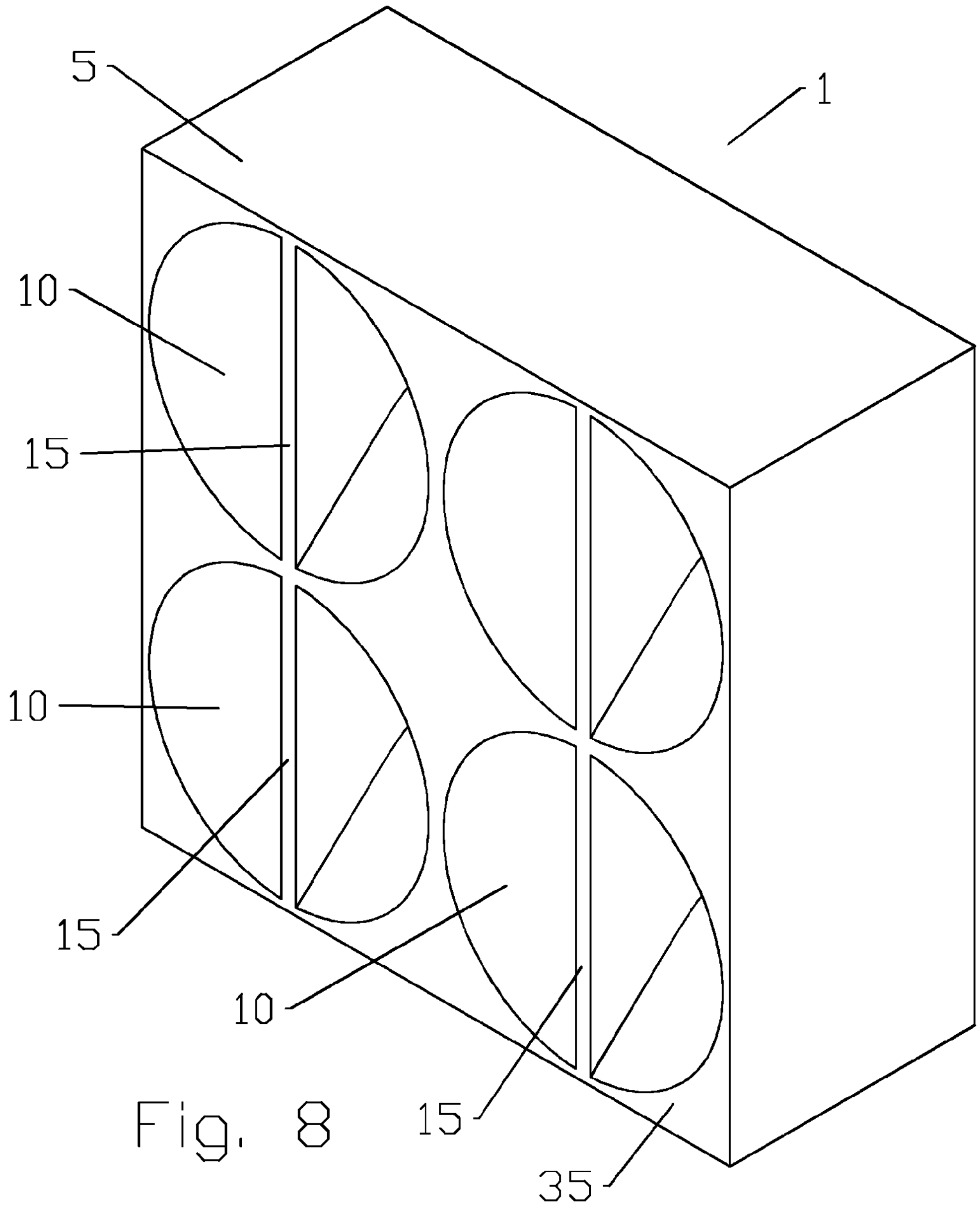
FIG. 8 is a schematic isometric view of an alternative twist septum polarization rotator, demonstrating multiple rotators in a unitary body.
Figure 9:
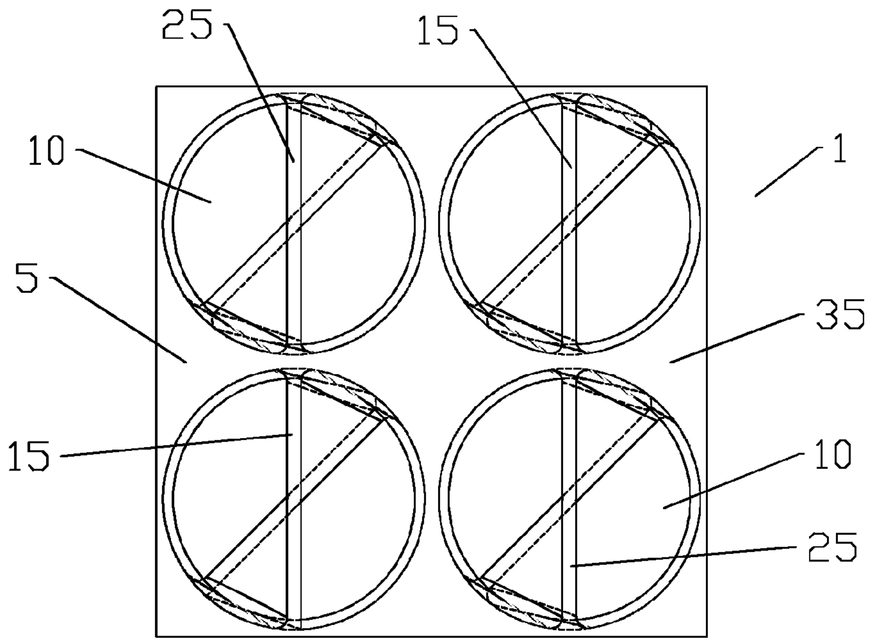
FIG. 9 is a schematic front view of the rotator of FIG. 8.
Figure 10:
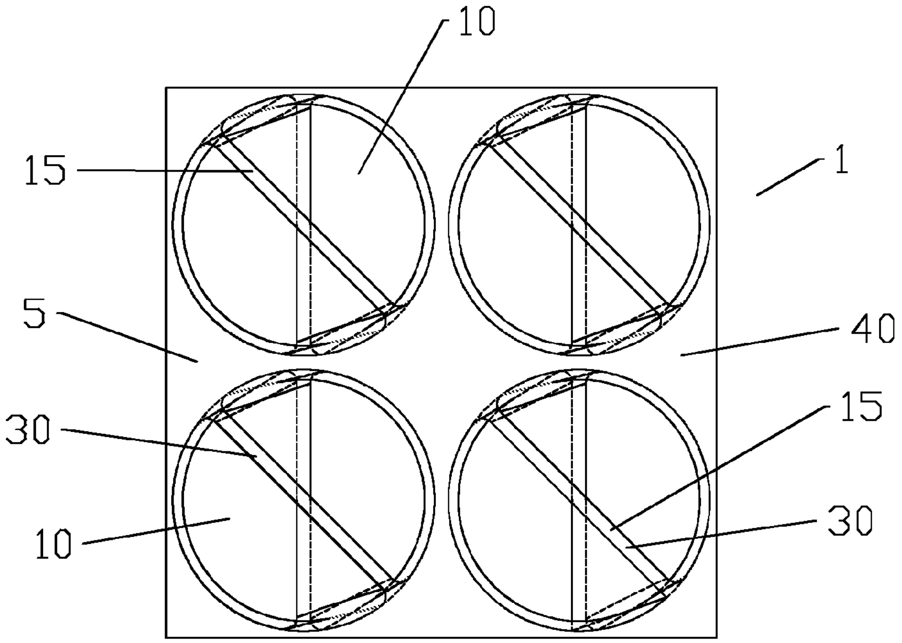
FIG. 10 is a schematic back view of the rotator of FIG. 8

As shown for example in FIGS. 1-3, an exemplary waveguide polarization rotator 1 has a unitary body 5 with a bore 10 in which a diametral septum 15 of the unitary body 5 extends between the sidewalls 20. The septum 15 twists, along the diameter, between a first end 25 of the septum 15 and a second end 30 of the septum 15. Thereby, an RF signal traveling along the bore 10 has a polarization shift corresponding to an angle between the first end 25 of the septum 15 and the second end 30 of the septum 15.

One skilled in the art will appreciate that diametral, as applied herein, is defined as a straight line segment passing through the center of a figure, such as a circle or rectangle (including a square). The twist of the diametral septum 15 changes the location of the intersections with the sidewall 20 of the line segment at successive longitudinal locations along the diametral septum 15, but the line segment always passes through the center, resulting in a helical characteristic of the diametral septum 15. Further, "unitary", as applied herein, is defined as describing the body as a single contiguous portion of homogeneous material. Therefore, a unitary body 5 and diametral septum 15 thereof would not be the result of integrating separate sub-elements by welding, soldering, gluing or the like.

One skilled in the art will appreciate that the bore 10 may be provided with a circular cross-section, as best demonstrated in FIGS. 1-3, or alternatively as an oval or rectangular cross-section. Further, the bore 10 may be provided with a cross-section that transitions between a first side 35 and a second side 40 of the unitary body, for example between a circular and rectangular cross section as demonstrated in FIGS. 4-7. Thereby, the waveguide polarization rotator 1 can incorporate a wave guide cross-sectional transition without requiring addition of a separate additional element to an antenna assembly. The septum 15 may be dimensioned with the first end 25 flush with a first side 35 of the unitary body 5 and the second end 30 of the septum 15 flush with a second side 40 of the unitary body 5. Alternatively, the septum 15 may be flush with one side or another or recessed within the bore 10 from both sides.

Figure 11:
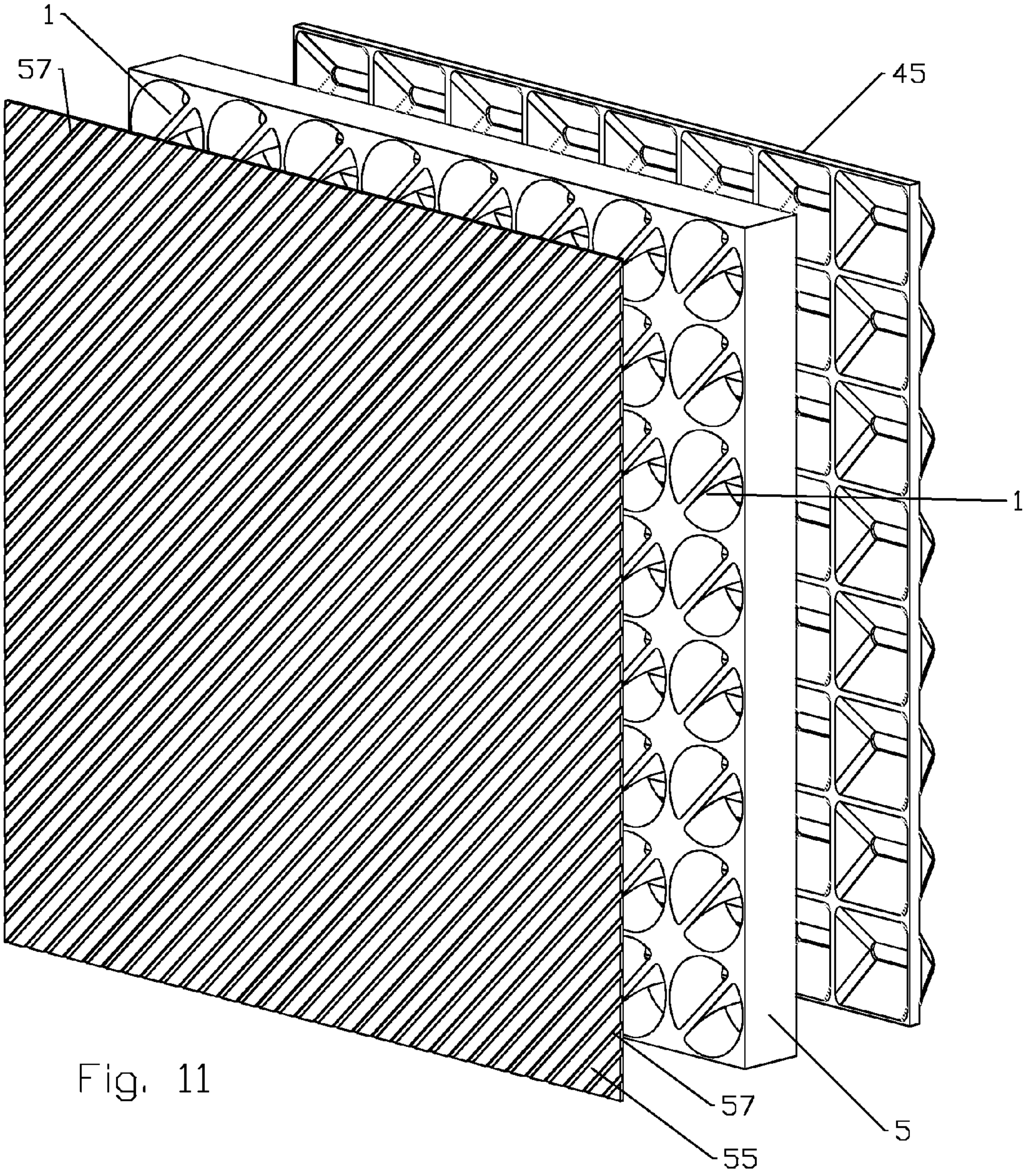
FIG. 11 is a schematic isometric view of an alternative twist septum rotator, demonstrating incorporation of a matrix of rotators with elements of a flat panel antenna and a parallel grid.

The waveguide polarization rotator 1 may be configured in a matrix configuration, for example as shown in FIGS. 8-11. In matrix configurations a plurality of additional bores 10 may be added to the unitary body 5, a longitudinal axis of the bore 10 and each of the additional bores 10 parallel to one another. Each of the additional bores 10 may be similarly provided with a diametral septum 15 of the unitary body 5 extending between sidewalls 20 of the additional bores 10. The arrangement of the bore 10 and plurality of additional bores 10 may be, for example, aligned in adjacent rows and columns or alternatively as staggered rows and columns, coaxial rings or the like according to the desired waveguide matrix the waveguide polarization rotator 1 is to be mated with. Thereby, a waveguide polarization rotator 1 may be configured, for example, to mate with the corresponding plurality of output horns on the output layer 45 of a flat panel array antenna, for example as shown in FIG. 11. Alternatively, the waveguide polarization rotator matrix may be applied as an internal layer of the flat panel antenna.

One skilled in the art will appreciate that the waveguide polarization rotator 1 may be cost effectively manufactured by molding and/or casting processes, such as polymer material injection molding or metallic material casting. When polymer material injection molding is applied, a conductive polymer may be applied or an additional step of metalizing at least the bore and septum areas of the unitary body 5 may be performed.

As best demonstrated in FIGS. 1-3, the features within the bore 10 may be applied without overhanging edges along the longitudinal axis, enabling molding or casting by a two-part mold that separates along a longitudinal axis of the bore 10 (and if present any additional bores 10, as each of the bores are parallel to one another). Further, edges along the intersection of the septum 15 and the sidewall 20 of the bore 10 may be provided with a corner fillet 50 or radius, as best shown in FIGS. 4-7.

Where the desired polarization twist angles would require a bore longitudinal extent that renders mold separation difficult, multiple complementary unitary bodies 10 may be stacked upon each other, the bores 10 of each aligned along their longitudinal axis to obtain the desired final twist angle. Alternatively, for minimization of the required longitudinal extent of the unitary body 5, the twist angle obtained may be reduced and additional twist obtained by applying a parallel grid 55 to the unitary body, for example as demonstrated by FIG. 11. The parallel grid 55 may be, for example, integrated into a radome of the antenna. The parallel grid 55 may be, for example, provided with a period between grid lines 57 that is less than a diameter of the bore 10.

Figure 12:
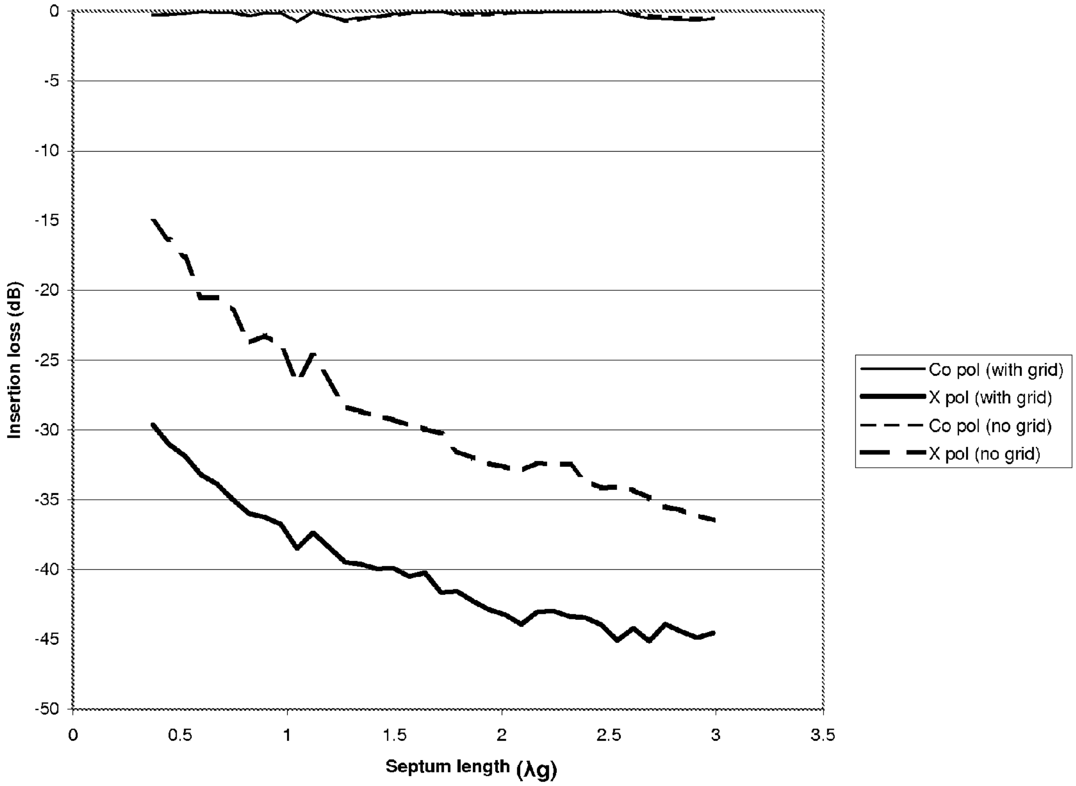
FIG. 12 is a chart demonstrating insertion loss with respect to longitudinal length of the septum, for co-polar and cross-polar signal components.
Figure 13:
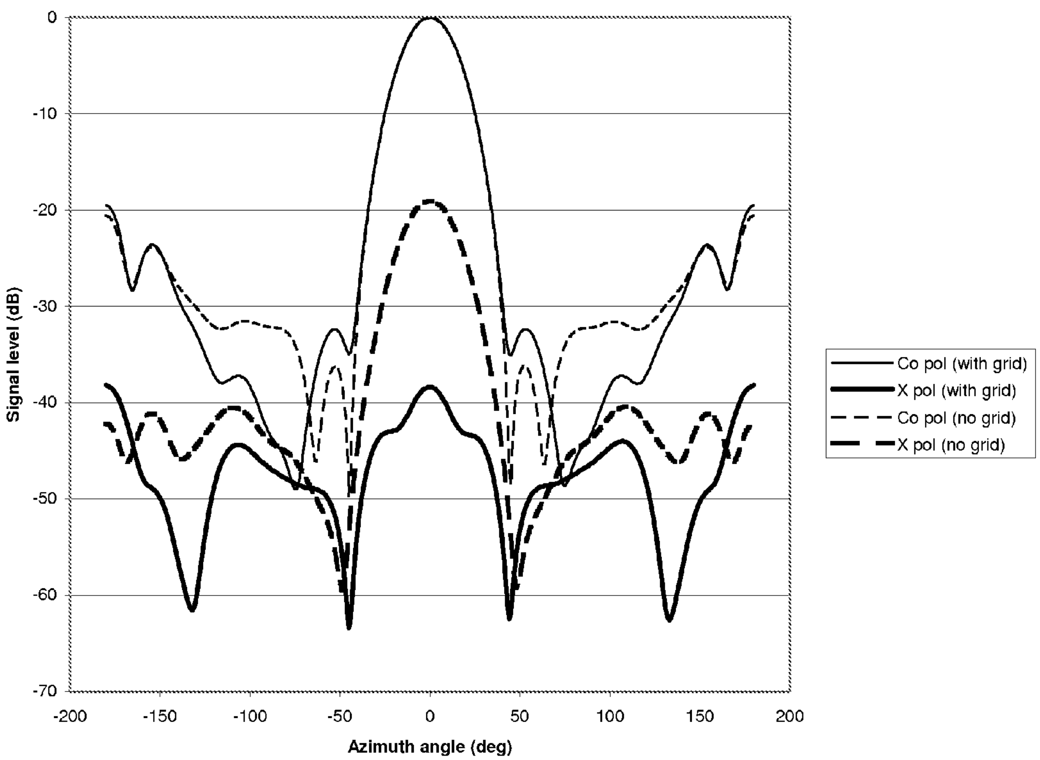
FIG. 13 is a chart demonstrating radiation pattern performance, for co-polar and cross-polar signal components, with and without a parallel grid.

The insertion loss of the twist septum polarization rotator 1 may be very low, even if the septum 15 is shortened, as demonstrated in FIG. 12. The addition of the parallel grid 55 also has the surprising effect of significantly reducing unwanted cross-polar signals, without appreciably impacting the desired co-polar components of the RF signal, as further demonstrated in FIG. 13.

One skilled in the art will also appreciate that the benefit of a parallel grid 55 is not limited to a twist septum type polarization rotator 1. The parallel grid 55 may be coupled with any form of waveguide polarization rotator to obtain the benefits of cross-polar signal suppression and/or reduced overall length of the polarization rotator.

One skilled in the art will further appreciate that the flat panel antenna is a particularly useful application for the matrix of waveguide polarization rotators 1 as a 45 degree twist as demonstrated in FIGS. 1-10, readily obtainable before overhanging edges and/or other draft considerations become an issue, is the polarization twist which enables a diamond mounting configuration of a square waveguide matrix flat panel antenna assembly which maximizes antenna signal intensity along the vertical and horizontal polarizations. Further, the increased output horn matrix size of such flat panel antennas may require machining precision that may make such polarization rotation matrixes commercially impractical, if not formed by molding or casting.

From the foregoing, it will be apparent that the present invention may bring to the art a high performance waveguide polarization rotator particularly suited for high density matrix configuration and/or cost efficient manufacture by molding or casting with a very high level of precision.

TABLE of Parts

| | |
|---|---|
| 1 | waveguide polarization rotator |
| 5 | unitary body |
| 10 | bore |
| 15 | septum |
| 20 | sidewall |
| 25 | first end |
| 30 | second end |
| 35 | first side |
| 40 | second side |
| 45 | output layer |
| 50 | fillet |
| 55 | parallel grid |
| 57 | grid line |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A waveguide polarization rotator, comprising:

a unitary body with a first bore; a diametral first septum of the unitary body extending between sidewalls of the first bore;

the first septum twisting between a first end of the first septum and a second end of the first septum.

2. The waveguide polarization rotator of claim 1, wherein the first bore has a circular cross-section.

3. The waveguide polarization rotator of claim 1, wherein the first bore has a circular cross-section at a first end and a rectangular cross section at a second end.

4. The waveguide polarization rotator of claim 1, wherein an angle of the first end of the first septum with respect to the second end of the first septum is forty-five degrees.

5. The waveguide polarization rotator of claim 1, wherein the first end of the first septum is flush with a first side of the unitary body and the second end of the first septum is flush with a second side of the unitary body.

6. The waveguide polarization rotator of claim 1, further including a parallel grid coupled to the unitary body.

7. The waveguide polarization rotator of claim 6, wherein the parallel grid is a radome.

8. The waveguide polarization rotator of claim 1, further including a plurality of second bores each with a diametral second septum of the unitary body extending between side-walls of the second bores; a longitudinal axis of the first bore and each of the second bores parallel to one another.

9. The waveguide polarization rotator of claim 8, wherein the first bore and the plurality of second bores are aligned in adjacent rows and columns.

10. A method for manufacturing a waveguide polarization rotator according to claim 1, comprising steps of:

forming the unitary body in a mold.

11. The method of claim 10, wherein the forming is by injection molding a polymer material in the mold.

12. The method of claim 11, further including the step of metalizing the unitary body.

13. The method of claim 10, wherein the unitary body is dimensioned to align the first bore with an output horn of an antenna.

14. The method of claim 10, wherein the unitary body is dimensioned to be a layer of a flat panel antenna.

15. The method of claim 10, wherein the first septum is configured with no overhanging edges, whereby the mold is via a two part mold separating along a longitudinal axis of the first bore.

16. The method of claim 10, wherein a pair of the unitary bodies are dimensioned to seat end to end, aligning the first bore of each of the unitary bodies with one another.

17. The method of claim 10, wherein the forming is via casting the unitary body with a metallic material.

18. A waveguide polarization rotator, comprising:

a body with a first bore; a diametral first septum within the first bore;

the first septum twisting between a first end of the first septum and a second end of the first septum; and a parallel grid coupled to the body.

19. The waveguide polarization rotator of claim 18, further including a plurality of second bores each with a diametral second septum within each of the second bores; a longitudinal axis of the first bore and each of the second bores parallel to one another.

20. The waveguide polarization rotator of claim 18, wherein the parallel grid has a period that is less than a diameter of the first bore.

* * * * *